(12) United States Patent
Maemura et al.

(10) Patent No.: US 7,308,887 B2
(45) Date of Patent: Dec. 18, 2007

(54) CONTROLLER FOR DIRECT-INJECTION INTERNAL COMBUSTION ENGINE AND METHOD OF CONTROLLING THE DIRECT-INJECTION INTERNAL COMBUSTION ENGINE

(75) Inventors: Jun Maemura, Aichi-ken (JP); Masanao Idogawa, Toyota (JP); Takeyasu Muraishi, Hamamatsu (JP)

(73) Assignees: Toyota Jidosha Kabushiki Kaisha, Toyota (JP); Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 11/492,004

(22) Filed: Jul. 25, 2006

(65) Prior Publication Data
US 2007/0023012 A1  Feb. 1, 2007

(30) Foreign Application Priority Data
Jul. 26, 2005 (JP) ............................. 2005-215434

(51) Int. Cl.
*F02D 41/06* (2006.01)
*F02B 3/02* (2006.01)
(52) U.S. Cl. ................. 123/491; 123/179.16; 123/305; 123/500
(58) Field of Classification Search ........... 123/179.16, 123/294, 305, 491, 500
See application file for complete search history.

(56) References Cited

U.S. PATENT DOCUMENTS

| 5,076,238 A | * | 12/1991 | Rosenau et al. | ............ 123/491 |
| 7,194,999 B2 | * | 3/2007 | Kono et al. | ................. 123/295 |
| 2007/0012295 A1 | * | 1/2007 | Maemura et al. | ........... 123/491 |

FOREIGN PATENT DOCUMENTS

| JP | A 09-242586 | 9/1997 |
| JP | A 11-270387 | 10/1998 |
| JP | A 2000-97071 | 4/2000 |
| JP | A 2003-269222 | 9/2003 |
| JP | A 2004-245196 | 9/2004 |

* cited by examiner

*Primary Examiner*—T. M Argenbright
(74) *Attorney, Agent, or Firm*—Oliff & Berridge, PLC (57) ABSTRACT

After initial combustion at the time of engine startup under very low temperature conditions, a fuel-injection start time point and a fuel-injection end time point are restricted to a period of time during which smoldering of an ignition plug is less prone to occur, to warm up the inside of a cylinder and increase engine speed. Thereafter, a fuel injection period is adjusted by gradually elongating it by reducing the restriction on the injection start time point and the injection end time point each time the engine speed exceeds a predetermined value in the course of the increase in the engine speed. In this way, the engines are made to reach a state where the engine can operate in a self-sustaining manner, before smoldering of the ignition plugs progresses after the initial combustion at the time of the engine startup under very low temperature conditions.

19 Claims, 4 Drawing Sheets

CONTROLLER FOR DIRECT-INJECTION INTERNAL COMBUSTION ENGINE AND METHOD OF CONTROLLING THE DIRECT-INJECTION INTERNAL COMBUSTION ENGINE

INCORPORATION BY REFERENCE

The disclosure of Japanese Patent Application No. 2005-215434 filed on Jul. 26, 2005 including the specification, drawings and abstract is incorporated herein by reference in its entirety.

BACKGROUND OF THE INVENTION

1. Field of the Invention

The present invention relates to a controller for a direct-injection internal combustion engine that is installed in a vehicle or the like and a method of controlling the direct-injection internal combustion engine. More specifically, the present invention relates to a controller for a direct-injection internal combustion engine and a method of controlling the direct-injection internal combustion engine that perform fuel injection control for maintaining good operational condition after initial combustion at the time of engine startup under very low temperature conditions.

2. Description of the Related Art

In a direct-injection internal combustion engine (hereinafter also referred to as the direct-injection engine), a fuel injection valve (injector) is provided for each cylinder. The fuel, such as gasoline, is directly injected into combustion chambers via the fuel injection valves, and mixed with intake air introduced from inlet ports into the combustion chambers to form a mixture, which is ignited by ignition plugs. The direct-injection engine is excellent because of low fuel consumption, low emission and high power output. For this reason, the demand for the engine is rapidly increasing.

However, in the direct-injection engine, the time period from when the fuel is injected to when the fuel reaches the ignition point is short as compared to that of a port-injection engine that injects the fuel into the inlet port. For this reason, when the engine is started at a very low temperature (below −25° C., for example), vaporization of the fuel injected into the cylinders becomes insufficient. As a result, fine ignition cannot be achieved, and the startability becomes worse.

As measures against such a problem that arises when the engine is started under very low temperature conditions, there are a method in which, when the engine is cranked at the time of engine startup under very low temperature conditions, the ignition is stopped (the ignition is cut off) for at least one cycle (see Japanese Patent Application Publication No. JP-A-2000-97071, for example), and a method in which only fuel injection is performed while cutting off the ignition of the ignition plugs for a predetermined period of time at an early stage of the engine startup (ignition cut-off period), and ignition is started while performing the fuel injection after the injection cut-off period has elapsed (see Japanese Patent Application Publication No. JP-A-11-270387, for example). By cutting off the ignition in this way, it becomes possible to accumulate the fuel, which will contribute to the ignition, in the cylinders, whereby it is possible to ensure the ignition (to achieve favorable initial combustion).

However, in direct-injection engines, even if favorable initial combustion is achieved by virtue of the ignition cutting-off control described above or the like at the time of the engine startup under very low temperature conditions, the operational condition can become worse due to the fuel injection period set after the initial-combustion stage. In particular, in direct-injection engines for which great importance is attached to the performance, in which, for this reason, the operation angle of the intake cam is set to a large angle, and in which combustion is weak in a startup state, or in direct-injection engines in which friction is large, if the fuel injection period set after the initial-combustion stage is a period during which wetting of the injection plugs is prone to occur, smoldering of the injection plugs occurs at an early stage or the middle stage of the engine startup, which can make it impossible to start the engine.

As technologies for controlling the fuel injection period while the engine has not yet reached a state where complete combustion is achieved (a state where the engine can operate in a self-sustaining manner) at the time of engine startup, there are methods described in Japanese Patent Application Publication No. JP-A-2003-269222 and Japanese Patent Application Publication No. JP-A-09-242586 described below, for example.

In a method described in Japanese Patent Application Publication No. JP-A-2003-269222, it is determined whether the engine is operating in a startup state where complete combustion is not achieved yet. If it is determined that the engine is operating in a startup state where complete combustion is not achieved yet, until complete combustion is achieved, the injection start timing is retarded relative to the normal injection start timing that is adopted after complete combustion has been achieved. In the method described in Japanese Patent Application Publication No. JP-A-09-242586, the fuel-injection start time is set so that, at the time of engine startup (before complete combustion is achieved), fuel injection is completed in good time before a compression stroke ends.

The method described in Japanese Patent Application Publication No. JP-A-2003-269222 is a method for solving a problem that, when a port-injection engine is operating in a startup state where complete combustion is not achieved yet, fuel shortage due to port wetting (the adhesion of fuel to the inner wall surface of the port) occurs. Specifically, this is a method in which, in a startup state, until complete combustion is achieved, the injection start timing is retarded relative to the normal injection start timing that is adopted after complete combustion has been achieved, so that the injection amount at the time of engine startup is increased by a certain amount. The problem that smoldering of the ignition plugs occurs after the initial combustion at the time of the engine startup under very low temperature conditions cannot be solved by applying the method described in Japanese Patent Application Publication No. JP-A-2003-269222 to the direct-injection engine.

The method described in Japanese Patent Application Publication No. JP-A-09-242586 is a method used to prevent the actual injection end time point from being significantly retarded relative to a predetermined injection end time point when the number of cranking revolutions is rapidly increased during engine startup (before the complete combustion is achieved). The problem that smoldering of the ignition plugs occurs after the initial combustion at the time of the engine startup under very low temperature conditions cannot be solved by using the method described in Japanese Patent Application Publication No. JP-A-09-242586.

SUMMARY OF THE INVENTION

The present invention provides a controller for a direct-injection internal combustion engine and a method of controlling the direct-injection internal combustion engine that make it possible to avoid smoldering of an ignition plug after initial combustion at the time of engine startup under very low temperature conditions, and that can improve startability under very low temperature conditions.

A first aspect of the present invention is a controller for a direct-injection internal combustion engine in which fuel is directly injected into a combustion chamber of a cylinder via a fuel injection valve, and a mixture formed thereby is burned by igniting the mixture via an ignition plug, which controller controls fuel injection timing of the fuel injection valve, the controller including: an injection-time-point restriction device that, after initial combustion at the time of engine startup under very low temperature conditions, restricts a fuel-injection start time point and a fuel-injection end time point to within a period of time during which smoldering of the ignition plug is less prone to occur, to warm up the inside of the cylinder and increase engine speed; and an injection-timing adjustment device that adjusts a fuel injection period from the injection start time point to the injection end time point by elongating the fuel injection period by reducing the restriction on the injection start time point to the injection end time point in response to increase in the engine speed.

In the first aspect of the present invention, the fuel injection period may be elongated by reducing the restriction on the injection start time point and the injection end time point each time the engine speed exceeds a predetermined value in the course of the increase in the engine speed due to the restriction on the injection start time point and the injection end time point after initial combustion.

In the first aspect of the present invention, to warm up the inside of the cylinder does not mean to warm up the engine so that the coolant temperature reaches 80° C. or more, for example (complete warming up), but means to warm up the inside of the cylinder to the extent that the fuel can be easily atomized in the cylinder.

Operation of the first aspect will be described below.

After favorable initial combustion is achieved by performing the ignition cutting-off control or the like, smoldering of the ignition plug is inhibited by restricting the fuel-injection start time point and the fuel-injection end time point. In this way, it is possible to maintain good combustion conditions after the initial combustion. As a result, the engine speed is increased, and the inside of the cylinders is warmed up. On the other hand, because the injection start time point and the injection end time point are restricted, the amount of injected fuel is small, and, therefore, the internal combustion engine cannot reach the complete combustion state (the state in which the engine can operate in a self-sustaining manner).

For this reason, the good combustion condition is maintained by using the restriction on the injection start time and the injection end time described above (hereinafter also referred to as the restriction on the injection timing), and, when the engine speed has increased to an engine speed at which resistance to smoldering is judged to have been improved, the restriction on the injection timing is reduced, whereby the fuel injection period (the time period from the injection start time to the injection end time) is elongated. If the fuel injection period is elongated in this way, the amount of injected fuel and the generated torque are increased, and the engine speed is further increased. As a result, the internal combustion engine can reach the complete combustion state. The adjustment process in which the restriction on the injection timing is reduced, and the fuel injection period is thereby elongated, may be performed once. However, if the process for gradually elongating the fuel injection period by reducing the restriction on the injection start time and the injection end time is repeatedly performed each time the engine speed exceeds a predetermined value in the course of the increase in the engine speed, the internal combustion engine can reach the complete combustion state more smoothly.

Next, description will be given of the injection start time point and the injection end time point adopted after the initial combustion.

With regard to direct-injection engines having resistance to smoldering, the engines can be started even if the fuel injection period is set as long as possible (for example, injection start time point: 390 degrees BTDC (Before Top Dead Center), and injection end time point: 60 degrees BTDC), and the fuel is therefore injected near the top dead center (TDC). In contrast, with regard to direct-injection engines for which great importance is attached to the performance, and in which, for this reason, combustion is weak in a startup state, or direct-injection engines in which friction is large, if the fuel is injected near the top dead center, smoldering of the ignition plugs occurs at an early stage of or during engine startup, which can make it difficult to start the engine. Considering such a point, in the first aspect of the present invention, immediately after the initial combustion, both the injection start time point and the injection end time point are restricted to a period of time that does not include a period of time near the top dead center, whereby smoldering of the ignition plugs after the initial combustion is avoided.

If the fuel injection period is overly shortened by restricting the injection start point and the injection end point immediately after the initial combustion, the amount of injected fuel falls short, and it becomes impossible to achieve good combustion conditions. It is preferable that, in order to avoid such a situation, the injection start time point and the injection end time point are set so that the fuel injection period is within a range (crank angle range) in which smoldering of the ignition plug can be avoided, and that the fuel injection period maximizes an amount of injected fuel. Specifically, injection timing that the injection start time point is set to 300 degrees BTDC, and that the injection end time point is set to 120 degrees BTDC (see the fuel injection period C1 shown in FIG. 4) can be cited, for example.

According to the first aspect of the present invention, after the initial combustion at the time of the engine startup under very low temperature conditions, the fuel-injection start time point and the fuel-injection end time point are restricted to a period of time during which smoldering of the ignition plug is less prone to occur, to warm up the inside of the cylinder and increase the engine speed. Thereafter, the restriction on the injection start time point and the injection end time point is reduced in response to increase in the engine speed to make an adjustment by elongating the fuel injection period. In this way, smoldering of the ignition plug after the initial combustion can be avoided, and it is possible to improve the startability under very low temperature conditions.

A second aspect of the present invention is a method of controlling a direct-injection internal combustion engine in which fuel is directly injected into a combustion chamber of a cylinder via a fuel injection valve, and a mixture formed thereby is burned by igniting the mixture via an ignition plug, which method controls fuel injection timing of the fuel injection valve, the method including: after initial combustion at the time of engine startup under very low temperature conditions, restricting a fuel-injection start time point and a fuel-injection end time point to within a period of time during which smoldering of the ignition plug is less prone to occur, to warm up the inside of the cylinder and increase engine speed; and adjusting a fuel injection period from the injection start time point to the injection end time point by elongating the fuel injection period by reducing the restriction on the injection start time point to the injection end time point in response to increase in the engine speed.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Description will be given below of an embodiment of the present invention with reference to the drawings.

First, an engine (internal combustion engine) to which the present invention is applied will be described.

Engine

Figure 1:
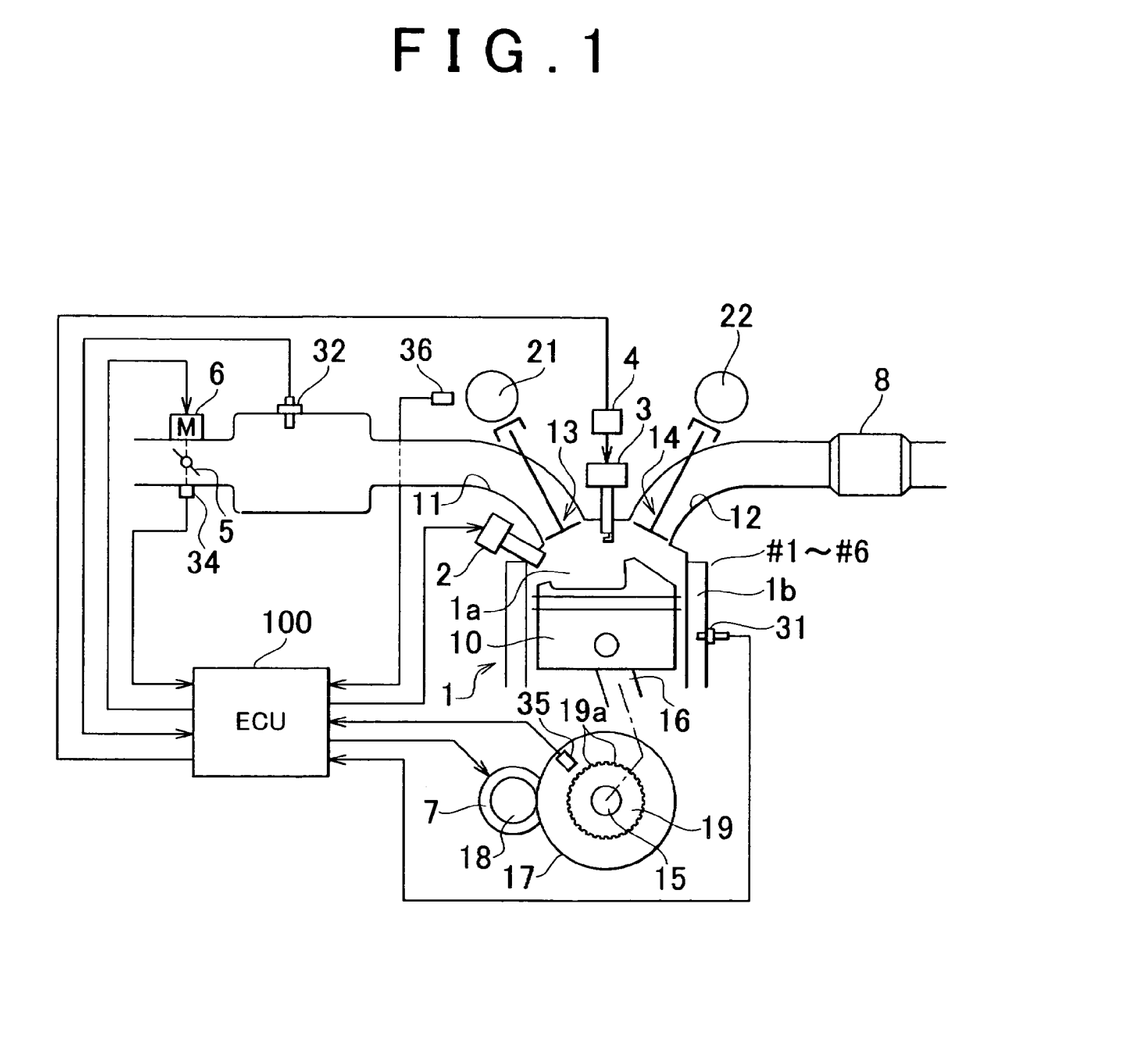
FIG. 1 is a schematic configuration diagram showing an example of a direct-injection engine to which the present invention is applied.

FIG. 1 is a diagram showing a schematic configuration of the engine to which the present invention is applied. In FIG. 1, a configuration of one cylinder of the engine is illustrated.

The engine 1, which is a direct-injection 6-cylinder gasoline engine having six cylinders (cylinders #1 to #6), includes pistons 10, each of which defines a combustion chamber 1a, and a crankshaft 15, which is an output shaft. The pistons 10 are connected to the crankshaft 15 via connecting rods 16. The connecting rods 16 convert the reciprocation of the pistons 10 into the rotational motion of the crankshaft 15.

The crankshaft 15 is provided with a ring gear 17. The ring gear 17 engages with a pinion gear 18 of a starter motor 7 that is activated when the engine is started. The rotation of the ring gear 17 following the activation of the starter motor 7 cranks the engine 1.

A signal rotor 19 having a plurality of protrusions (teeth) 19a on the outer circumferential surface thereof is attached to the crankshaft 15. A crank position sensor (engine speed sensor) 35 is disposed beside the signal rotor 19. The crank position sensor 35, which is an electromagnetic pick-up, for example, generates pulse-like signals (output pulses) corresponding to the protrusions 19a of the signal rotor 19 when the crankshaft 15 rotates.

The combustion chamber 1a of the engine 1 is provided with an ignition plug 3 for each of the cylinders #1 to #6. An igniter 4 controls the ignition timing of the ignition plugs 3. The engine 1 is provided with a water temperature sensor 31 for detecting a temperature of coolant (coolant temperature) circulating through a water jacket 1b.

Air intake passages 11 and exhaust passages 12 are connected to the combustion chambers 1a of the engine 1. Air intake valves 13 are placed between the air intake passages 11 and the combustion chambers 1a. Opening and closing operations of the air intake valves 13 cause the air intake passages 11 and the combustion chambers 1a to communicate with and to be cut off from each other. Exhaust valves 14 are placed between the exhaust passages 12 and the combustion chambers 1a. Opening and closing operations of the exhaust valves 14 cause the exhaust passages 12 and the combustion chambers 1a to communicate with and to be cut off from each other. The opening and closing operations of the air intake valves 13 and the exhaust valves 14 are carried out by the rotation of an intake camshaft 21 and an exhaust camshaft 22 to which the rotation of the crankshaft 15 is transmitted.

A cam position sensor 36 for identifying each cylinder is placed near the intake camshaft 21. The cam position sensor 36, which is an electromagnetic pick-up, for example, is placed so as to face a protrusion (tooth) on the outer circumferential surface of a rotor integrated with the intake camshaft 21. The cam position sensor 36 outputs pulse-like signals when the intake camshaft 21 rotates. Because the intake camshaft 21 rotates at half the rotational speed of the crankshaft 15, the cam position sensor 36 generates a pulse-like signal (output pulse) every time the crankshaft 15 rotates 720 degrees.

A throttle valve 5 for regulating the air intake of the engine 1 is disposed upstream of the air intake passage 11. A throttle motor 6 drives the throttle valve 5. A throttle position sensor 34 detects the opening degree of the throttle valve 5. A vacuum sensor 32 for detecting pressure (intake pressure) in the air intake passage 11 is placed in the air intake passage 11, downstream of the throttle valve 5. A three-way catalyst 8 is placed in the exhaust passage 12 of the engine 1.

In the engine 1, an injector (fuel injection valve) 2 for directly injecting the fuel into the combustion chamber 1a is provided for each of the cylinders #1 to #6. High-pressure fuel is supplied to the injectors 2 of the cylinders, and the fuel is directly injected into the combustion chambers 1a via the injectors 2. Thereafter, a mixture of air and fuel is formed in the combustion chambers 1a, ignited by the ignition plugs 3, and thus burned in the combustion chambers 1a. The combustion of the mixture in the combustion chambers 1a causes the pistons 10 to reciprocate, which causes the crankshaft 15 to rotate.

The operational state of the engine 1 as described above is controlled by an ECU (Electronic Control Unit) 100.

ECU

Figure 2:
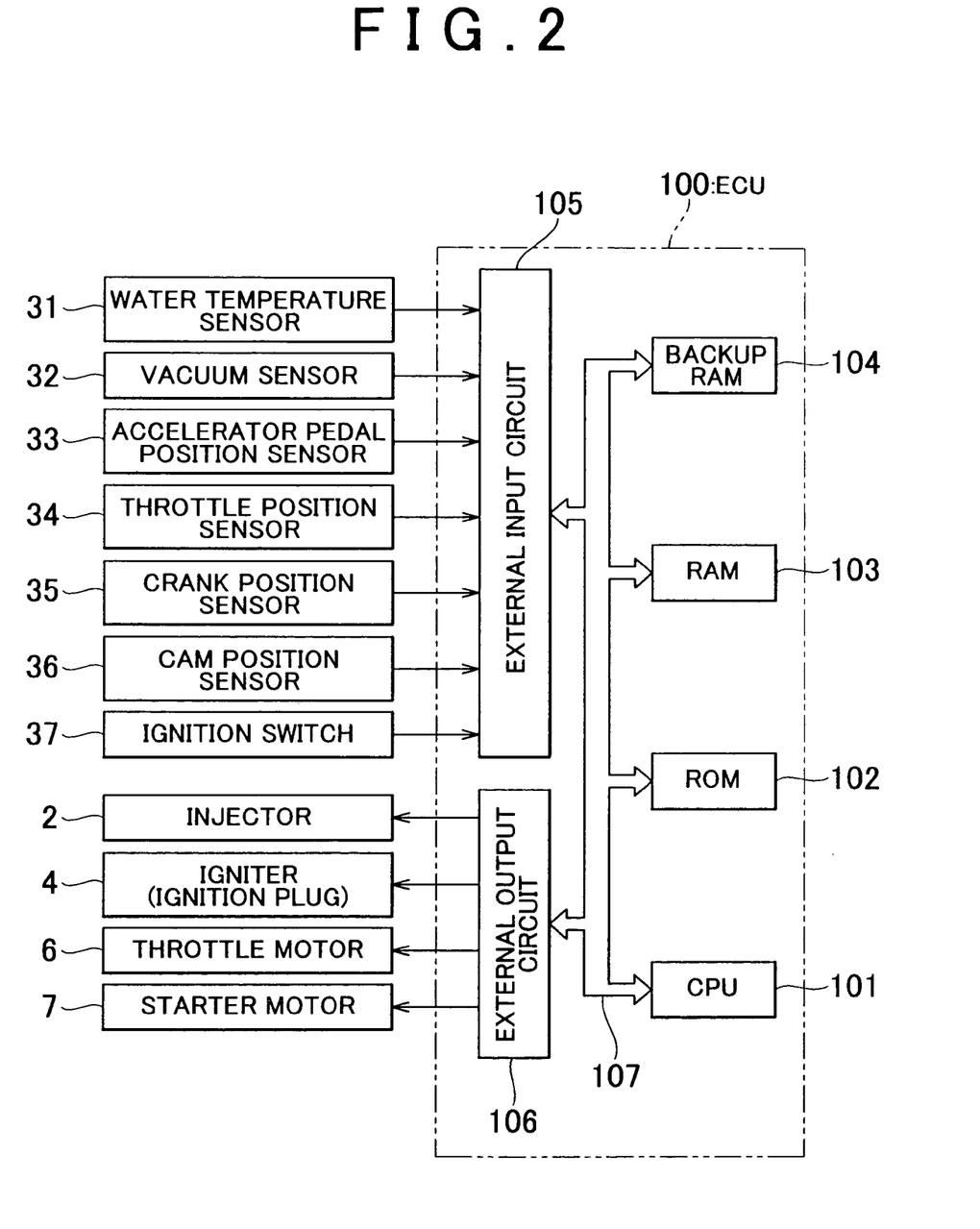
FIG. 2 is a block diagram showing a configuration of a control system including an ECU etc.

As shown in FIG. 2, the ECU 100 includes a CPU 101, a ROM 102, a RAM 103, and a backup RAM 104.

Various control programs, maps that are referred to when the various control programs are executed, and the like are stored in the ROM 102. The CPU 101 performs processing, based on the various control programs and the maps stored in the ROM 102. The RAM 103 is a memory that temporarily stores, for example, calculation results outputted from the CPU 101, and the data supplied from the sensors. The backup RAM 104 is a nonvolatile memory that stores the data to be stored when the engine 1 is stopped. The ROM 102, the CPU 101, the RAM 103, and the backup RAM 104 are connected to one another via a bus 107, and are also connected to an external input circuit 105 and an external output circuit 106.

The water temperature sensor 31, the vacuum sensor 32, an accelerator pedal position sensor 33, the throttle position sensor 34, the crank position sensor 35, the cam position sensor 36, and an ignition switch 37 are connected to the external input circuit 105. The injectors 2, the igniter 4 of the ignition plugs 3, the throttle motors 6 of the throttle valves 5, and the starter motor 7 are connected to the external output circuit 106.

The ECU 100 performs various control operations for the engine 1 that include the open/close control of the injectors 2 (the control of the fuel-injection start time point and the fuel-injection end time point), based on the outputs from the various sensors including the water temperature sensor 31, the vacuum sensor 32, the accelerator pedal position sensor 33, the throttle position sensor 34, the crank position sensor 35, and the cam position sensor 36. In addition, the ECU 100 performs the engine start control under very low temperature conditions described below.

Engine Start Control Under Very Low Temperature Conditions

An example of the very low-temperature engine-start control performed by the ECU 100 will be described with reference to a flow chart shown in FIG. 3. With regard to this embodiment, direct-injection engines for which great importance is attached to the performance, and in which, for this reason, the operation angle of the intake cam is set to a large angle, and direct-injection engines in which friction is large are the subjects.

In step ST1, when the request to start the engine 1 is made, that is, when the ignition switch is turned on, the coolant temperature is read from the output from the water temperature sensor 31. If the coolant temperature is equal to or below a predetermined value (−25° C., for example), the ECU 100 determines that the request to start the engine under very low temperature conditions has been made, and the process proceeds to step ST2. If the determination result in step ST1 is NO, this routine is exited.

In step ST2, the ignition cutting-off control is performed. Specifically, the ECU 100 calculates, from a map, the requested number of times the ignition is cut off, based on parameters, such as the coolant temperature, the number of cranking revolutions, the fuel-injection start time point and the fuel-injection end time point. After the process of calculating the number of times the ignition is cut off is finished, cranking the engine 1 is started, and only fuel injection is performed with the ignition cut off. Then, after the actual number of times the ignition is cut off reaches the calculated, requested number of times the ignition is cut off, the engine 1 starts ignition from the cylinder at which the ignition was first cut off (initial combustion).

In the case of a 6-cylinder engine, the requested number of times the ignition is cut off is six (one-time injection for each cylinder), twelve (two-time injections for each cylinder), or eighteen (three-time injections for each cylinder), for example.

After the first explosion occurs after the above-described ignition cutting-off control is performed (the determination result in step ST3 is YES), the fuel-injection start time point and the fuel-injection end time point are restricted to within a period of time during which smoldering of the ignition plugs 3 is less prone to occur, in step ST4. Specifically, as shown in FIG. 4, a fuel injection period C1 is set by setting the fuel-injection start time point to 300 degrees BTDC, and setting the fuel-injection end time point to 120 degrees BTDC.

By restricting the injection time points, it is possible to inhibit smoldering of the ignition plugs 3 after favorable initial combustion occurs, so that it is possible to maintain good combustion condition after the initial combustion. As a result, the speed of the engine 1 (hereinafter referred to as the engine speed (ne)) increases, and the cylinders are warmed up. However, because the fuel-injection start time point and the fuel-injection end time point are restricted, the amount of injected fuel is small, and, therefore, the engine 1 cannot reach the complete combustion state (the state in which the engine can operate in a self-sustaining manner). For this reason, in this embodiment, control is performed so that the engine 1 can reach the state in which the engine can operate in a self-sustaining manner, by performing the process in the following steps ST5 to ST8.

In step ST5, the ECU 100 reads the engine speed (ne) from the output from the crank position sensor 35, and determines whether the engine speed (ne) exceeds 300 rpm. Once the engine speed (ne) exceeds 300 rpm, the ECU 100 determines that the resistance to smoldering has been improved as compared to that exhibited immediately after the initial combustion, and the process proceeds to step ST6. In this step, the restriction on the injection time points is reduced. Specifically, as shown in FIG. 4, the ECU 100 sets the injection start time point to 330 degrees BTDC, and sets the injection end time point to 90 degrees BTDC to reduce the restriction on the injection period, whereby the fuel injection period is increased from C1 to C2. When the fuel injection period is elongated in this way, the amount of injected fuel and the generated torque are increased, and the engine speed (ne) is further increased.

In step ST7, the ECU 100 determines whether the engine speed (ne) exceeds 500 rpm. Once the engine speed (ne) exceeds 500 rpm, the ECU 100 determines that the resistance to smoldering has been further improved, and the process proceeds to step ST8. In this step, the restriction on the injection period is further reduced. Specifically, as shown in FIG. 4, the ECU 100 sets the injection start time point to 360 degrees BTDC, and sets the injection end time point to 90 degrees BTDC to reduce the restriction on the injection period, whereby the fuel injection period is increased from C2 to C3. When the fuel injection period is elongated in this way, the amount of injected fuel and the generated torque are increased, and the engine speed (ne) is further increased. As a result, the engine 1 approaches a state in which the engine can operate in a self-sustaining manner.

When the speed of the engine 1 reaches an engine speed at which the engine 1 can operate in a self-sustaining manner (800 rpm, for example, when the engine is started under very low temperature conditions), that is, when the determination result in step ST9 becomes YES, this routine is exited, and the engine 1 starts normal operation.

According to the very low-temperature engine-start control of this embodiment, immediately after the initial combustion at the time of the engine startup under very low temperature conditions, when smoldering of the ignition plug 3 is prone to occur, the fuel-injection start time point and the fuel-injection end time point are restricted, so that the cylinders are warmed up, and that the engine speed (ne) is increased. When the resistance to smoldering has been improved due to increase in the engine speed (ne), the restriction on the injection start time point and the injection end time point is reduced, whereby the fuel injection period is elongated. The torque is increased in this way. Thus, the engine 1 can reach the complete combustion state before smoldering of the ignition plugs 3 progresses. In this way, even in the case of direct-injection engines for which great importance is attached to the performance, and in which, for this reason, the operation angle of the intake cam is set to a large angle, or direct-injection engines in which friction is large, it is possible to achieve good startability under very low temperature conditions.

Other Embodiments

Figure 3:
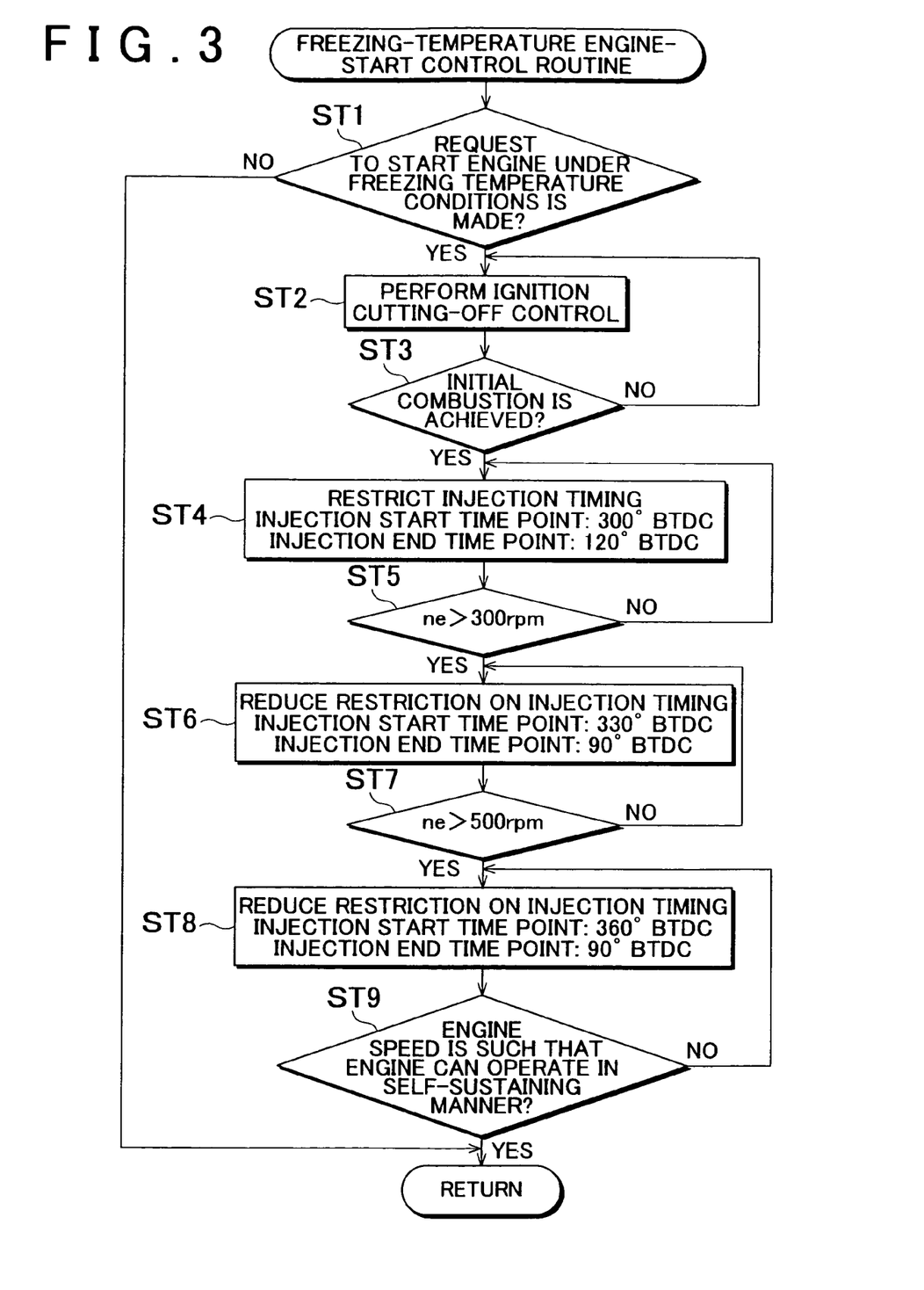
FIG. 3 is a flow chart showing an example of a process of very low-temperature engine-start control performed by the ECU.
Figure 4:
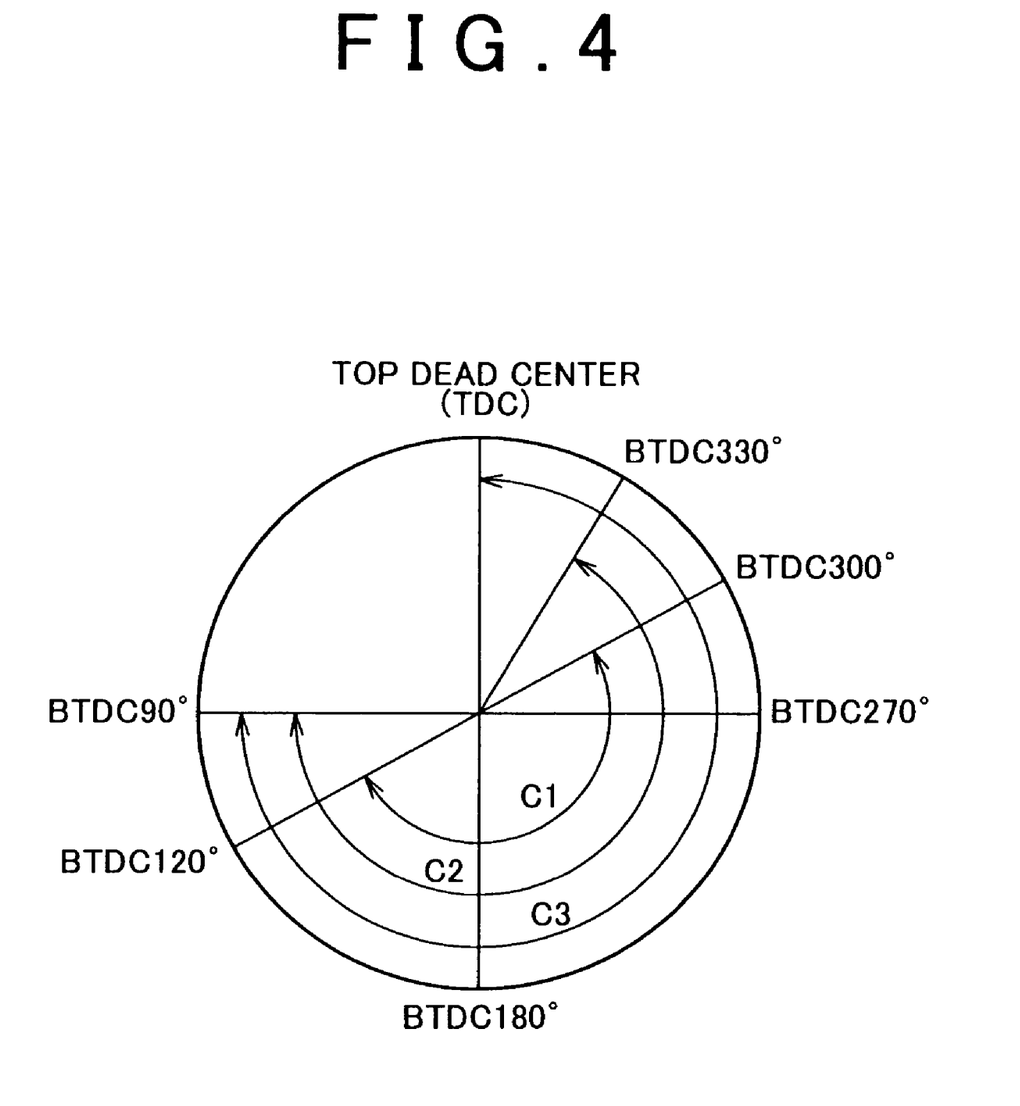
FIG. 4 is a diagram for explaining a process of restricting the fuel-injection start time point and the fuel-injection end time point, which process is performed in the very low temperature-engine-start control shown in FIG. 3.

In the very low-temperature engine-start control described above, the limit values of the fuel-injection start time point and the fuel-injection end time point set in step ST4 of FIG. 3 is not particularly limited, as long as the injection period is restricted to within the period during which smoldering of the ignition plugs is less prone to occur. The limit values may be selected as appropriate, depending on the characteristics of the direct-injection engine to which the present invention is applied. The criterion value of the engine speed (ne) to be used in the determination in steps ST5 and ST7, and the limit values of the injection start time point and the injection end time point set in steps ST6 and ST8 are also not particularly limited. The criterion value and the limit values may be selected as appropriate, depending on the characteristics of the direct-injection engine to which the present invention is applied.

In the above-described embodiments, the ignition cutting-off control is performed after the engine is started under very low temperature conditions in step ST2. However, the ignition cutting-off control may be omitted if, without performing the ignition cutting-off control, favorable initial combustion can be achieved after the engine is started under very low temperature conditions. The ignition cutting-off control may be replaced by different control that makes it possible to accumulate the fuel in the cylinders that will contribute to the ignition.

In the above-described embodiments, the following process is repeated twice: immediately after the initial combustion, the injection start time point and the injection end time point are restricted; and the restriction on the injection time points is reduced, whereby the fuel injection period is elongated (steps ST5 and ST6, and steps ST7 and ST8). However, the present invention is not limited to the embodiments. The process in which the restriction on the injection time points is reduced to elongate the fuel injection period may be performed once, or may be performed three times or more.

In the above description, the embodiments are illustrated in which the present invention is applied to direct-injection engines for which great importance is attached to the performance, and in which, for this reason, the operation angle of the intake cam is increased, and direct-injection engines in which friction is large. However, the applications of the present invention are not limited to such engines. The present invention can also be applied to other direct-injection engines, in which smoldering of the ignition plug is prone to occur after the initial combustion at the time of the engine startup under very low temperature conditions.

In the above description, the embodiments are illustrated in which the present invention is applied to direct-injection 6-cylinder gasoline engines. However, the applications of the present invention are not limited to such engines. The present invention can also be applied to direct-injection gasoline engines with an arbitrary number of cylinders, such as direct-injection 4-cylinder gasoline engines.

What is claimed is:

1. A controller for a direct-injection internal combustion engine in which fuel is directly injected into a combustion chamber of a cylinder via a fuel injection valve, and a mixture formed thereby is burned by igniting the mixture via an ignition plug, which controller controls fuel injection timing of the fuel injection valve, the controller comprising:
an injection-time-point restriction device that, after initial combustion at the time of engine startup under very low temperature conditions, restricts a fuel-injection start time point and a fuel-injection end time point to within a period of time during which smoldering of the ignition plug is less prone to occur, to warm up the inside of the cylinder and increase engine speed; and
an injection-timing adjustment device that adjusts a fuel injection period from the injection start time point to the injection end time point by elongating the fuel injection period by reducing the restriction on the injection start time point to the injection end time point in response to increase in the engine speed.

2. The controller for a direct-injection internal combustion engine according to claim 1, wherein the injection-timing adjustment device elongates the fuel injection period by reducing the restriction on the injection start time point and the injection end time point each time the engine speed exceeds a predetermined value in the course of the increase in the engine speed.

3. The controller for a direct-injection internal combustion engine according to claim 1, wherein the injection-time-point restriction device restricts the injection start time point and the injection end time point to a period of time that does not include a period of time near the top dead center of the internal combustion engine, during which smoldering of the ignition plug is less prone to occur.

4. The controller for a direct-injection internal combustion engine according to claim 1, wherein the injection-timing adjustment device adjusts the fuel injection period from the injection start time point to the injection end time point by elongating the fuel injection period by reducing the restriction on the injection start time point to the injection end time point when the engine speed is increased to a speed at which resistance to smoldering of the ignition plug is judged to have been improved.

5. The controller for a direct-injection internal combustion engine according to claim 4, wherein, when the engine speed exceeds 300 rpm, the injection-timing adjustment device determines that resistance to smoldering has been improved, and adjusts the fuel injection period from the injection start time point to the injection end time point by elongating the fuel injection period by reducing the restriction on the injection start time point to the injection end time point.

6. The controller for a direct-injection internal combustion engine according to claim 1, wherein the injection-time-point restriction device restricts the injection start time point and the injection end time point so that the fuel injection period is within a crank angle range in which smoldering of the ignition plug can be avoided, and that the fuel injection period maximizes an amount of injected fuel.

7. The controller for a direct-injection internal combustion engine according to claim 6, wherein the injection-time-point restriction device restricts the injection timing by setting the injection start time point to 300 degrees BTDC, and setting the injection end time point to 120 degrees BTDC.

8. The controller for a direct-injection internal combustion engine according to claim 7, wherein the injection-timing adjustment device reduces the restriction on the injection timing by setting the injection start time point to 330 degrees BTDC, and setting the injection end time point to 90 degrees BTDC.

9. The controller for a direct-injection internal combustion engine according to claim 7, wherein the injection-timing adjustment device reduces the restriction on the injection timing by setting the injection start time point to 360 degrees BTDC, and setting the injection end time point to 90 degrees BTDC.

10. A method of controlling a direct-injection internal combustion engine in which fuel is directly injected into a combustion chamber of a cylinder via a fuel injection valve, and a mixture formed thereby is burned by igniting the mixture via an ignition plug, which method controls fuel injection timing of the fuel injection valve, the method comprising:

after initial combustion at the time of engine startup under very low temperature conditions, restricting a fuel-injection start time point and a fuel-injection end time point to within a period of time during which smoldering of the ignition plug is less prone to occur, to warm up the inside of the cylinder and increase engine speed; and adjusting a fuel injection period from the injection start time point to the injection end time point by elongating the fuel injection period by reducing the restriction on the injection start time point to the injection end time point in response to increase in the engine speed.

11. The method of controlling a direct-injection internal combustion engine according to claim 10, wherein the fuel injection period is elongated by reducing the restriction on the injection start time point and the injection end time point each time the engine speed exceeds a predetermined value in the course of the increase in the engine speed.

12. The method of controlling a direct-injection internal combustion engine according to claim 10, wherein the injection start time point and the injection end time point are restricted to a period of time that does not include a period of time near the top dead center, during which smoldering of the ignition plug is less prone to occur.

13. The method of controlling a direct-injection internal combustion engine according to claim 10, wherein the fuel injection period from the injection start time point to the injection end time point is adjusted by elongating the fuel injection period by reducing the restriction on the injection start time point to the injection end time point when the engine speed is increased to a speed at which resistance to smoldering of the ignition plug is judged to have been improved.

14. The method of controlling a direct-injection internal combustion engine according to claim 13, wherein, when the engine speed exceeds 300 rpm, it is determined that resistance to smoldering has been improved, and the fuel injection period from the injection start time point to the injection end time point are adjusted by elongating the fuel injection period by reducing the restriction on the injection start time point to the injection end time point.

15. The method of controlling a direct-injection internal combustion engine according to claim 10, wherein the injection start time point and the injection end time point are restricted so that the fuel injection period is within a crank angle range in which smoldering of the ignition plug can be avoided, and that the fuel injection period maximizes an amount of injected fuel.

16. The method of controlling a direct-injection internal combustion engine according to claim 15, wherein the injection timing is restricted by setting the injection start time point to 300 degrees BTDC, and setting the injection end time point to 120 degrees BTDC.

17. The method of controlling a direct-injection internal combustion engine according to claim 16, wherein the restriction on the injection timing is reduced by setting the injection start time point to 330 degrees BTDC, and setting the injection end time point to 90 degrees BTDC.

18. The method of controlling a direct-injection internal combustion engine according to claim 16, wherein the restriction on the injection timing is reduced by setting the injection start time point to 360 degrees BTDC, and setting the injection end time point to 90 degrees BTDC.

19. A controller for a direct-injection internal combustion engine in which fuel is directly injected into a combustion chamber of a cylinder via a fuel injection valve, and a mixture formed thereby is burned by igniting the mixture via an ignition plug, which controller controls fuel injection timing of the fuel injection valve, the controller comprising:

injection-time-point restriction means for, after initial combustion at the time of engine startup under very low temperature conditions, restricting a fuel-injection start time point and a fuel-injection end time point to within a period of time during which smoldering of the ignition plug is less prone to occur, to warm up the inside of the cylinder and increase engine speed; and injection-timing adjustment means for adjusting a fuel injection period from the injection start time point to the injection end time point by elongating the fuel injection period by reducing the restriction on the injection start time point to the injection end time point in response to increase in the engine speed.

* * * * *